US005575051A

United States Patent [19]

Moore

[11] Patent Number: 5,575,051

[45] Date of Patent: Nov. 19, 1996

[54] HIGH IMPACT POWER TOOL HAVING SHOCK ABSORBING MEANS

[75] Inventor: Steven C. Moore, East Bridgewater, Mass.

[73] Assignee: Marson/Creative Fastener Group, Taunton, Mass.

[21] Appl. No.: 301,479

[22] Filed: Sep. 7, 1994

Related U.S. Application Data

[63] Continuation of Ser. No. 75,037, Jun. 10, 1993, abandoned.

[51] Int. Cl.$^6$ .............................. B23P 11/02; B21J 15/10
[52] U.S. Cl. .................................. 29/243.523; 173/162.1
[58] Field of Search ...................... 29/243.521, 243.522, 29/243.523, 243.524, 243.525, 243.53; 227/52, 55, 130; 173/210, 211, 162.1

[56] References Cited

U.S. PATENT DOCUMENTS

| Re. 33,766 | 12/1991 | Duffy et al. . | |
|---|---|---|---|
| 3,774,437 | 11/1973 | Young | 29/243.526 |
| 3,995,074 | 11/1976 | Duffy et al. . | |
| 4,054,688 | 10/1977 | Duffy et al. . | |
| 4,060,868 | 12/1977 | Axvig et al. . | |
| 4,100,882 | 7/1978 | Duffy et al. . | |
| 4,120,993 | 10/1978 | Duffy et al. . | |
| 4,366,190 | 12/1982 | Rodden et al. . | |
| 4,535,925 | 8/1985 | Ramey et al. | 227/55 |
| 4,775,555 | 10/1988 | Duffy . | |
| 4,815,414 | 3/1989 | Duffy et al. . | |
| 4,835,819 | 6/1989 | Duffy et al. . | |
| 4,867,366 | 9/1989 | Kleinholz | 227/130 X |
| 4,915,013 | 4/1990 | Moraht et al. | 227/130 X |
| 5,000,365 | 3/1991 | Fealey | 227/130 |
| 5,170,923 | 12/1992 | Dear et al. | 227/55 |

OTHER PUBLICATIONS

Nylok Self–Locking Fasteners, Nylok Fastener Corporation 1989.
Nylok Aero–Patch, Aero–Pellet and Aero–Tip, Nylok Fastener Corporation, Oct. 1990.
High–Quality, Reusable Self–Locking Fasteners, Torkon Fastener Corporation 1982.

*Primary Examiner*—Rinaldi I. Rada
*Attorney, Agent, or Firm*—Wolf, Greenfield & Sacks, P.C.

[57] ABSTRACT

A power tool having shock absorbing material secured along the threads of threaded components. The shock absorbing material is nylon and is applied in either nib or patch arrangements.

2 Claims, 4 Drawing Sheets

5,575,051

HIGH IMPACT POWER TOOL HAVING SHOCK ABSORBING MEANS

This application is a continuation, of application Ser. No. 08/075,037, filed Jun. 10, 1993, now abandoned.

FIELD OF THE INVENTION

This invention relates generally to a shock absorbing element for use in tools which undergo extreme amounts of stress and vibration during normal use, and more particularly for use in pneumatic hydraulic riveting tools.

BACKGROUND OF THE INVENTION

Pneumatic hydraulic riveting tools are one example of tools which undergo extreme amounts of shock and vibration during use. Other tools include manual riveters and manual and power operated staplers and nailers. Extreme amounts of vibration and shock also occur in drills and other non-fastener devices.

The vibrations and shocks that pass through these tools affect the individual components which are mounted on one another. Because the tools are not molded from a single piece of material, there is no uniform vibration of the components. Therefore, the components are pushed together and pulled apart during each use. With repeated use, the threads may bend, break, or otherwise become damaged.

No satisfactory shock absorber has heretofore been available for high vibration power tools. One must simply rely on the tight engagement of components to prevent damage to the tool. Maintenance of these devices requires frequent checking and periodic tightening of the components. Especially in threaded engagements, severe vibrations or shocks frequently cause damage to the components requiring their replacement, if not the entire tool. The use of lock washers to prevent damage has proved unsatisfactory.

Experiments have found that rivet tools without one or more shock absorbers and which has not been subject to periodic tightening exhibit damaged threads after approximately 5,000 uses.

An inexperienced user may not check the rivet gun as often as recommended. Therefore, maximizing the number of uses before potential thread damage may occur is most desirable as it would increase the life of the components of the tool.

SUMMARY OF THE INVENTION

The principal object of the present invention is to provide means for absorbing the shock in tools which undergo significant shock and vibration during normal use.

It is still another object of the present invention to provide means to decrease the chances of damage to thread-engaged components.

The present invention includes the use of patches, nibs or pellets, or strips (hereinafter "patches" unless otherwise noted) secured by known methods to threaded components. These patches exhibit shock absorbing characteristics when used in conjunction with tools which endure extreme amounts of vibration or shock during normal use. A patch is applied to the threaded portion of a first component which is subsequently screwed onto a second component. As the vibration or shock passes through the first component and into the second, the patch, which conforms to the space between the components, constricts and absorbs the shock.

The objects, advantages and features of this invention will be more clearly appreciated from the following detailed description read with reference to the accompanying drawings, in which:

DETAILED DESCRIPTION OF THE PREFERRED EMBODIMENT

The present invention comprises the use of patches applied along the threaded portion of components of a tool to absorb shock and vibration as described above. The patches may be made from a variety of materials, including nylon, Kel-F, and Vespel®. Many companies apply the patches to threaded components in different shapes and sizes as needed. One such firm is Nylok Fastener Corporation.

These patches have never been used in the high powered tool industry, in particular, power tools such as rivet guns, nailers, staplers, and drills. Patches have been primarily used in the automobile and aerospace industries. The present invention may be advantageously used in and tool which is subject to extreme amounts of shock or vibration. The description herein of use of the present invention on a pneumatic hydraulic rivet gun is merely exemplary and should not be considered the only possible tool application.

A detailed description will first be provided of the riveter 10 without discussion of the patches. The description of the riveter will be followed by a discussion of the location of the patches throughout the device.

Figure 1:
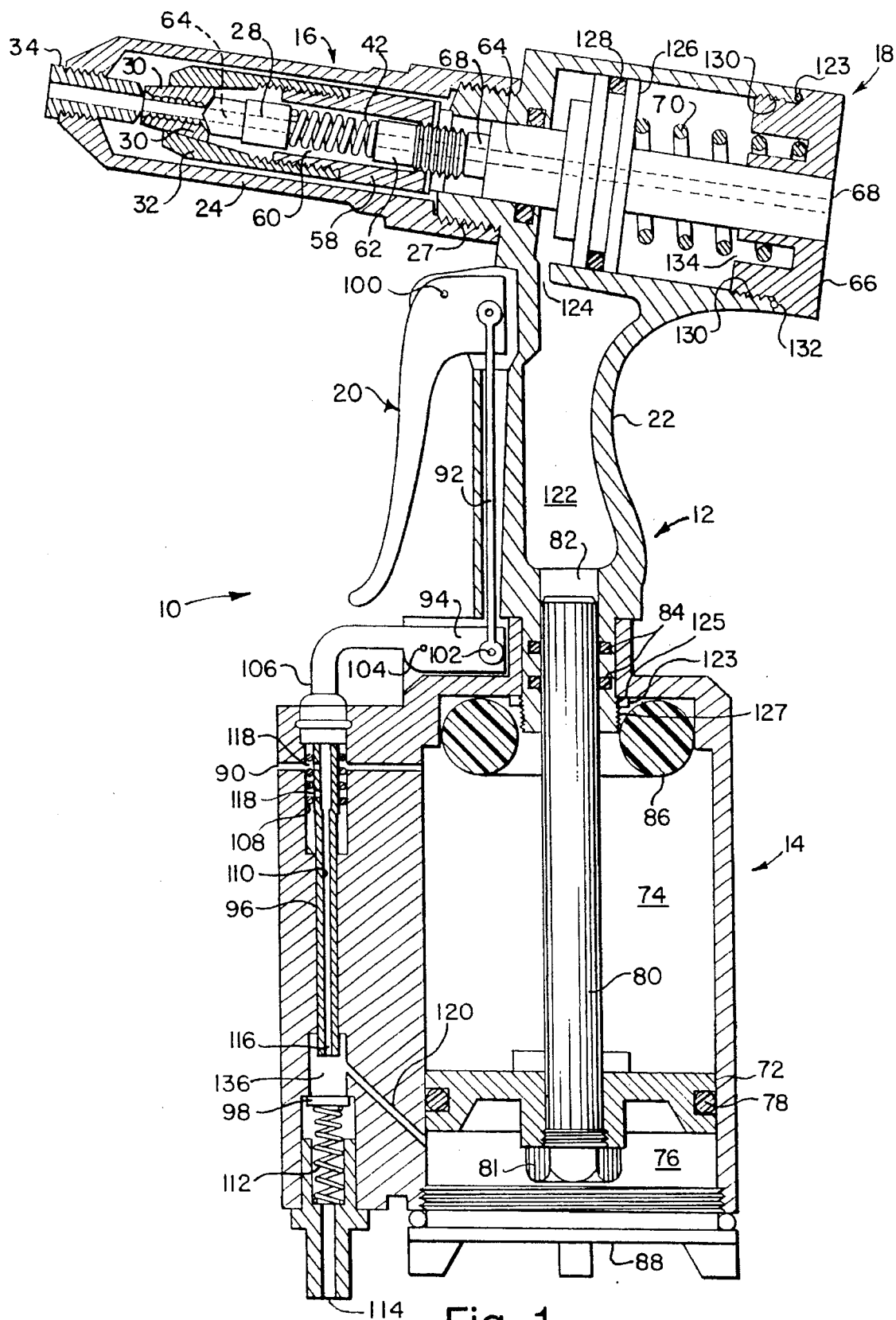
FIG. 1 is a cross-sectional view of a pneumatic hydraulic actuated portable riveter incorporating this invention.

With reference now to the drawings, and more particularly to FIG. 1, the riveter 10 of the present embodiment is pneumatically actuated and is driven-by hydraulic pressure. Riveter 10 includes a housing 12, pneumatic cylinder 14, head section 16 (FIG. 2), hydraulic cylinder 18, and a trigger actuator 20. Housing 12 may have a pistol grip shape 22 to conform to the shape of a person's hand, if desired.

Figure 3:
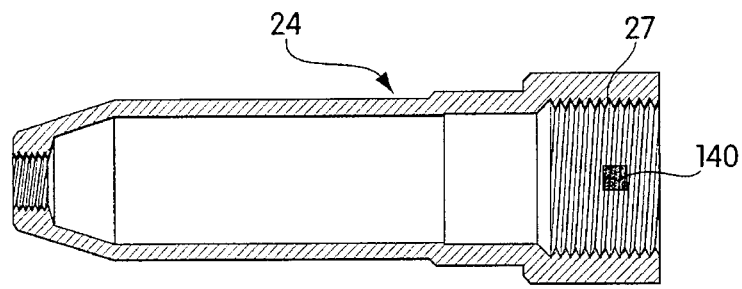
FIG. 3 is an isolated cross-section of the frame head.

The head section 16 of this embodiment is capable of grasping mandrel-type rivets having mandrels with diameters in the range of 3/32 of an inch to 1/4 of an inch inclusive. Frame head 24 surrounds and protects head section 16, and has a central axis 26 which extends along the center thereof in its direction of elongation. The frame head 24 has threads 27 which secure the head section 16 to the hydraulic cylinder 18 (FIG. 3).

Figure 2:
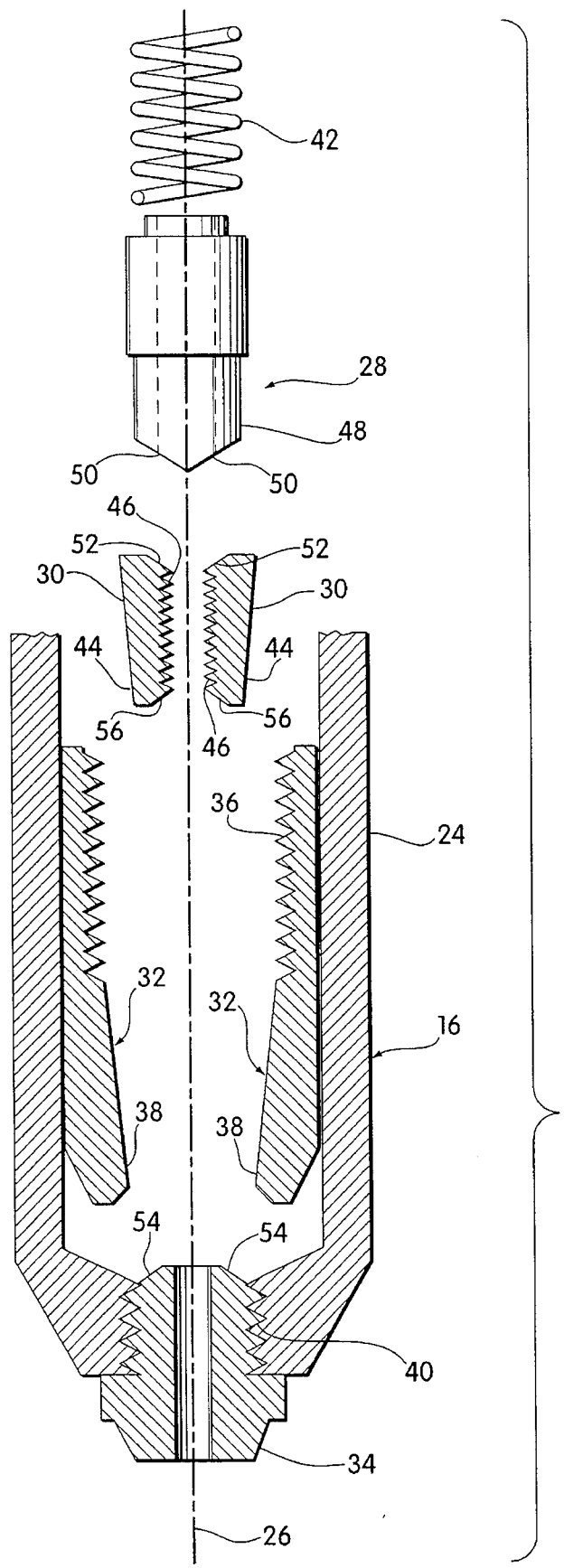
FIG. 2 is a partially exploded view of the head section of the riveter of FIG. 1.
Figure 4:
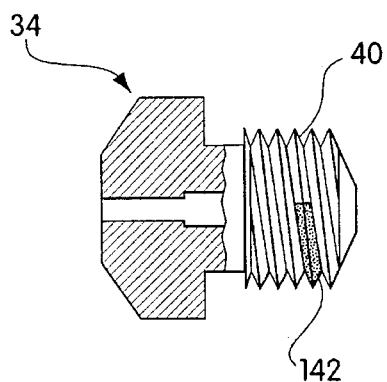
FIG. 4 is an isolated partial cross-section of the nosepiece.

As shown in FIGS. 1 and 2 disposed within frame head 24 are piston 28, a set of jaws 30, and jaw case 32. Secured to one end of frame head 24 is nosepiece 34. Jaw case 32 is adapted to be secured by threads 36 to a shaft coupled to an actuator, to be more fully described below, while jaw set 30 is adapted to slide within jaw case 32 along inclined walls 38 thereof. Piston 28 is axially slidable with respect to jaw set 30 and jaw case 32, while nosepiece 34 is secured by threads 40 to frame head 24 for convenient removal and replacement thereof (FIG. 4). Compression spring 42 biases piston 28 toward jaws 30.

The smooth, inclined, interior walls 38 of jaw case 32 are provided with a slope forwardly toward one another at about 9° with respect to axis 26 of head section 16. Each jaw 30 is provided with an outer surface 44 which is smooth and which is adapted to slide along an associated interior wall 38 of the jaw case 32. Each jaw 30 also has an interior gripping surface 46 which is spaced from the gripping surface 46 of the other jaws 30. The jaw surfaces 46 are adapted to grasp the mandrel of a rivet (not shown). Outer surface 44 of each jaw 30 typically forms an angle with respect to its gripping surface 46 equal to the slope of wall 38 so that the surfaces 46 always remains parallel to one another, while surfaces 44 remain generally parallel to their respective associated walls 38.

Piston 28 is provided with a forward end 48 which has symmetrically formed, sloped cam surfaces 50 which intersect along a line normal to axis 26. Surfaces 50 are typically disposed at an angle of about 30° with respect to a plane normal to axis 26. Corresponding cam surfaces 52 are provided on the rear end of each jaw 30, and surfaces 52 are disposed in generally parallel relationship with their corresponding surfaces 50.

Symmetrically disposed on opposite sides of the rear end of nosepiece 34 are cam surfaces 54 which form an angle of approximately 30° with a plane perpendicular to axis 26. Disposed on the forward end of each jaw 30 is a cam surface 56 which is adapted to ride along a corresponding surface 54 and which is disposed generally parallel to its corresponding surface 54. It is this arrangement and configuration of jaw case 32, jaws 30, nosepiece 34 and piston 28 which allows head section 16 to accept mandrel diameters of the range indicated.

Jaw case 32 is threaded onto rear jaw case or shaft extension 58 (FIG. 1). Extension 58 has an axial cylindrical bore 60 within which is disposed the compression spring 42. One end of spring 42 rests against the end of shaft 62 and the other end bears against the rear surface of piston 28 to bias piston 28 toward jaws 30. Bore 60 serves to guide piston 28 and to maintain it in the desired orientation, and also permits sliding motion of piston 28 with respect to extension 58 and jaw case 32.

Typically, jaw case 32 is threadably attached to extension 58, along extension threads 61 (FIG. 5), which in turn is threadably attached to shaft 62 on the forward end of piston rod 68 to facilitate removal and replacement of defective parts and of assembly of the apparatus. A central channel 64 extends through piston 28, extension 58, shaft 62, piston rod 68, and frame cap 66 to allow the mandrels broken from rivets to pass therethrough and be recovered at the rear end of the tool adjacent cap 66. Obviously, the broken mandrel may also fall out the forward end of the tool when the jaws 30 are open. Another method for removing a broken mandrel is a mandrel ejection system (not shown). Jaws 30 are maintained in a normally open condition by a spring 70 which urges extension 58 toward nosepiece 34 when trigger 20 is not actuated.

Figure 7:
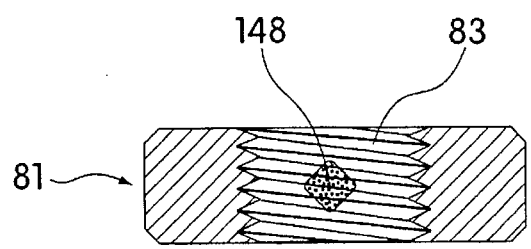
FIG. 7 is an isolated cross-section of the piston locknut.

Pneumatic cylinder 14 includes a circular piston 72 which is in a sealing and slidable relationship with the interior walls of the cylinder 14 and which defines an upper chamber 74 and lower chamber 76 in it. O-ring 78 provides the desired seal between piston 72 and interior walls of cylinder 14. Extending upwardly from piston 72 is piston rod 80 which has a locknut 81 secured to its end by inside threads 83 on the locknut 81 (FIG. 7). The locknut 81 locks the piston rod 80 and piston 72 together. The piston 80 passes through port 82 in cylinder 14 and enters the interior of housing 12 when the piston 72 is elevated. Piston rod 80 is maintained in sealing and sliding engagement with the interior surface of port 82 by a plurality, typically two, O-ring seals 84, and port 82 serves to guide and support rod 80. A stop 86 is provided at the end of cylinder 14 adjacent port 82 to limit upward travel of piston 72. The lower end of cylinder 14 is sealed with a cap 88. Vent 90 provides continuous gas communication between chamber 74 in cylinder 14 and the atmosphere to permit unimpeded motion of piston 72.

The trigger assembly includes a trigger 20, tigger rod 92, trigger lever 94, valve pusher 96, and valve 98. Trigger 20 is pivotally mounted to housing 12 by pivot 100, and one end of trigger rod 92 is pivotally secured to trigger 20 in spaced relation with pivot 100. The other end of trigger rod 92 is secured to trigger lever 94 by pivot pin 102, and lever 94 is mounted on the upper end of cylinder 14 by pivot 104 which is spaced from pin 102. Trigger lever 94 is provided with an arm 106 which extends downwardly generally parallel to piston rod 80 and which is coupled to valve pusher 96. An O-ring seal 108 is mounted on the top end of pusher 96. Valve pusher 96 which is hollow extends downwardly through bore 110, and is of a length to push valve 98 downwardly and unseat it when pushed by the trigger lever 94. A spring 112 is disposed below valve 98 and biases the valve 98 to the closed position. Disposed below valve 98 is a tube 114 which is coupled to a source of compressed air (not shown). The bottom 116 of the tube 96 is open, and ports 118 are provided at the top of the tube 114 at the O-rings 108 so that when the tube 114 is in the position shown in FIG. 1 it provides an exhaust from chamber 76 through duct 120, the interior of tube 96, ports 118 and vent 90 to the atmosphere. When valve 98 is unseated, passage 114 is in communication with the duct 120 so as to allow air under pressure to enter chamber 76 to drive piston 72 upwardly as viewed in FIG. 1, while the bottom 116 of the tube 96 is closed against the valve 98 and the O-rings 108 otherwise block the escape of air about the tube 96.

Disposed immediately above cylinder 14 is a hydraulic chamber 122 within housing 12, which is filled with hydraulic fluid. The cylinder 14 and housing 12 are secured together by a frame locknut 123. The frame locknut 123 has threads 125 which mate with the threaded portion 127 of the housing 12. This locknut 123 usually receives the greatest amount of shock and vibration during use of the riveter 10.

Figure 6:
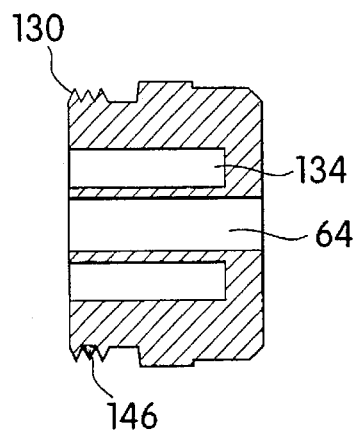
FIG. 6 is an isolated cross-section of the frame cap.

Chamber 122 communicates with hydraulic cylinder 18 by port 124. Hydraulic cylinder 18 includes a piston 126 which travels within cylinder 18, and an O-ring seal 128 provides sliding and sealing engagement between the interior walls thereof and piston 126. Cylinder 18 is sealed at its rear end by the cap 66 along cap threads 130 (FIG. 6). The cap 66 is also provided with an O-ring seal 132. A return spring 70 within cylinder 18 biases piston 126 forwardly toward head section 16. Spring 70 resides within annular recess 134 formed in cap 66. Extending from piston 126 in both directions is a piston rod 68, and one end of piston rod 68 projects into head section 16 and its other end projects rearwardly through cap 66 in sliding relation therewith for guiding movement of piston 126.

In operation, when it is desired to open jaws 30 to accept a rivet mendtel, spring 42 is compressed by applying a forwardly directed force against its rear end by an actuator described below to drive piston 28 forwardly with respect to the rear of the jaws 30. At the same time, jaw case 32 is also urged forwardly with respect to nosepiece 34 by the actuator. Cam surfaces 50 bear against the corresponding surfaces 52 of the jaws 30 to spread them apart at their rear end and to force jaws 30 against nosepiece 34. Cam surfaces 54 of the nosepiece 34 spread jaws 30 apart at their forward end in concert with the spreading thereof by piston 28 at their rear end. This action separates jaw gripping surfaces 46 and keeps them generally parallel to one another to accept the mandrel of a rivet. Once the mandrel has been inserted, jaw case 32 is retracted by the actuator to be described, generally parallel to axis 26 and away from nosepiece 34. Spring 42 continues to bias piston 28 against jaws 30, and jaw surfaces 44 to ride upwardly along walls 38 of the jaw case 32, which drives jaws 30 together to tightly grasp the mandrel between surfaces 46. Continued retraction of jaw case 32 retracts jaws 30 when jaws 30 can no longer be forced closer together, and the mandrel is broken.

With the mandrel inserted through nosepiece 34, the operator may grasp the tool around housing 12 and with his fingers wrapped around trigger 20. Trigger 20 is actuated by squeezing it towards housing 12. When trigger 20 is squeezed or depressed, it pivots about pivot 100, pulling trigger rod 92 upwardly toward cylinder 18, causing trigger lever 94 to pivot counterclockwise about pivot 104 and driving valve pusher 96 downwardly. This action unseats valve 98 from its normal position over valve opening 136, and allows compressed air to pass from opening 114 through valve opening 136, channel 120 and into chamber 76. Because spring 112 biases valve 98 upwardly to the closed position of FIG. 1, compressed air continues to flow into chamber 76 only so long as trigger 20 is depressed. When compressed air from the source (not shown) flows into chamber 76, piston 72 rises upwardly, causing piston rod 80 to rise upwardly through port 82 and enter hydraulic chamber 122. Air in chamber 74 above piston 72 is vented through vent 90 to allow such movement of piston 72. Since hydraulic chamber 122 is filled with hydraulic fluid, the fluid is displaced by the piston rod upwardly out of chamber 122 through port 124 and into hydraulic cylinder 18 on the front side of piston 126 (toward head section 16). The flow of fluid into hydraulic cylinder 18 drives piston 126 to the right, as shown in FIG. 1, compressing return spring 70. This motion of piston 126 withdraws piston extension 62 from head section 16, thereby moving jaw case 32 away from nosepiece 34 and causing jaws 30 to grasp the mandrel. Continued depression of trigger 20 sets the rivet and breaks off the mandrel. Release of trigger 20 causes valve 98 to seat under the influence of spring 112 and seal opening 136. Flow of compressed air into chamber 76 is stopped, and air flows into chamber 74 above piston 74 through vent 90. Chamber 76 is also connected to the atmosphere as described above by passage 120, hollow tube 96, ports 118 and vent 90. Spring 70 returns piston 126 to the left as shown in FIG. 1, forcing the fluid out of cylinder 18 and into chamber 122 and driving piston rod 80 and piston 72 downwardly to the position shown in FIG. 1. Jaws 30 return to their normally open condition and release the mandrel therefrom and allow it to be removed either through nosepiece 34 or out the back of the tool through channel 64.

Piston 28, jaws 30, jaw case 32, and nosepiece 34 are typically formed of a hardened steel or other similar material. In addition, the various parts of the pneumatically actuated tool 10 are typically formed of machined, hardened steel or other comparable materials. The various O-ring seals and springs are those commonly used in such tools.

For reference purposes, examples of the dimensions of various parts of the head section of the riveter 10 are set forth. It is to be understood that by providing such examples the scope of the invention is in no way limited. Piston 28 typically has a length of about $13/16$ inch and a diameter of about $3/8$ inch. The diameter of channel 64 is typically about $3/16$ inch. Nosepiece 34 has a typical length of about $1/2$ inch and a diameter at its widest point of about $1/2$ inch. Nosepiece 34 has a hexagonal shape to allow the application of a wrench for loosening and tightening thereof. Jaw case 32 typically has a length of about one and $27/64$ inches and an outside of a diameter of about $25/32$ inch. The inside diameter thereof its narrowest portion is about 0.312 inches.

The application of the present invention can best be seen in FIGS. 3–8. Nibs and patches are generally known and their application is accomplished by a variety of known methods. A nib is a piece plug-like of the selected material such as nylon, Kel-F or Vespel® which fills a recess drilled into the threads of a component. The nib is also called a pellet. The patch, on the other hand, is a coating of material applied along the surface of the threads. While a wider surface area is required for patches rather than nibs, cost and effectiveness of each are virtually the same. Often the determination as to whether to use a nib or patch depends on the component to be shipped or the degree of accessibility to the threads for application of the shock absorber. A nib application requires a greater degree of access to the threaded portion than the application of a patch.

The thread sizes for the components for the present invention shown in FIGS. 3–8 are also known in the art. The amount of patch or nib material required, as well as its location, is determined by known formulae which take into consideration the shock or vibration imparted on the component.

In FIG. 3, a $3/32$ inch nylon nib 140 is applied along threads 27 of the frame head 24. The nib 140 is centered on the threads 27 for securing together the frame head 24 and the hydraulic cylinder 18. The threads 27 in this embodiment measure $1 1/16$ UNS-2A.

The nosepiece 34 (FIG. 4) which has threads 40 is coated with patch 142. The patch 142 is applied to the full thread width halfway around the circumference of the nosepiece 34. In this application, the patch 142 is positioned between the nosepiece 34 and frame head 24. The nosepiece threads 40 measure $3/8$-24 UNF-2A.

Figure 5:
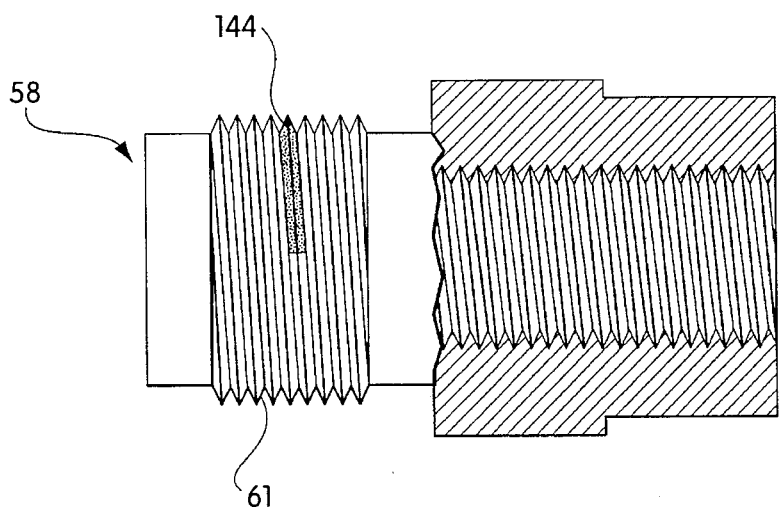
FIG. 5 is an isolated partial cross-section of the extension.

FIG. 5 shows the extension 58 having threads 61. The threads 61 measure $5/8$-24 UNEF-2A. A patch 144 having a $1/8$ inch width is applied along the center of the threaded area and extends halfway around the extension 58 and is disposed between the extension and the jaw case 32.

The frame end cap 66 of FIG. 6 has a nib 146 centered on threads 130 which measure $1 1/4$-16 UN-2A. The nib 146 measures $1/16$ inch. The frame cap 66 is secured to the housing 12.

Figure 8:
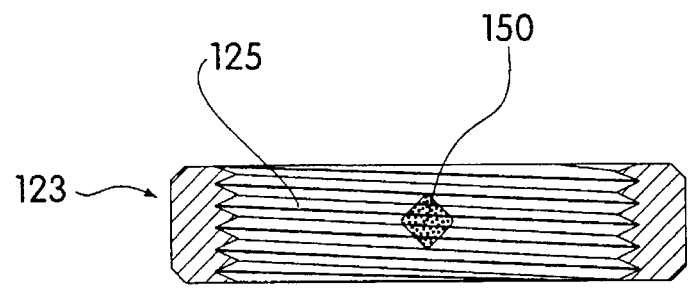
FIG. 8 is an isolated cross-section of the frame locknut.

FIG. 7 shows the piston locknut 81. Its threads 83 measure $5/16$-18 UN-2B. Here, a $3/32$ inch nib 148 is secured on the center of the threads 83 which in turn are secured to the piston rod 80. FIG. 8 shows the frame locknut 123 having threads 125 which measure $1 1/16$-16 UN-2B. Secured on the center of the threads 125 is a $3/32$ inch nylon nib 150. The frame locknut 123 secures the cylinder 14 and the housing 12 together.

The improved characteristic to the riveter 10 with these nibs and patches are extraordinary. After 5,000 uses of the riveter 10 without patches or nibs, failure increased dramatically. However, with the application of the nibs and patches to the present system, no signs of thread damage has been found even after 20,000 uses.

What is claimed is:

1. A method for assembling a riveter having a means to prevent damage to the riveter, comprising the steps of:

locating a series of paired engagements on the riveter which are subject to substantial shock and vibration, said series of engagements each comprising mateable first and second components each having a threaded portion wherein said first and second components of said series of paired engagements include a frame cap and an upper cylinder, a nosepiece and a frame head, an extension and a jaw case, a piston locknut and a piston rod, said frame head and said upper cylinder, a frame locknut and a housing, and said frame locknut and a pneumatic cylinder;

applying a nylon shock absorber on the threaded portion of either said first or second component of each of said paired engagements; and mating said first component and said second component along said threaded portions of each of said components to distribute shock and vibration generated by the riveter throughout the riveter.

2. A riveter having a means to prevent damage to the riveter, comprising:

a plurality of mated first and second components, which are subject to substantial shock and vibration each component having a threaded portion shaped to receive said threaded portion of said other component wherein said first and second components include a frame cap and an upper cylinder, a nosepiece and a frame head, an extension and a jaw case, a piston locknut and a piston rod, said frame head and said upper cylinder, a frame locknut and a housing, and said frame locknut and a pneumatic cylinder; and a nylon shock absorber secured on said threaded portion of one of said components in each of said plurality of mated components to distribute shock and vibration generated by the riveter throughout the riveter.

* * * * *